United States Patent [19]

Levad

[11] Patent Number: 5,320,371
[45] Date of Patent: Jun. 14, 1994

[54] BICYCLE TRAILER

[76] Inventor: James Levad, R.R. 1, Forest City, Iowa 50436

[21] Appl. No.: 48,843

[22] Filed: Apr. 16, 1993

[51] Int. Cl.⁵ .................................................. B60P 3/10
[52] U.S. Cl. ..................................... 280/204; 280/42; 280/47.331; 280/414.1; 280/656; 114/344
[58] Field of Search .............. 280/204, 42, 656, 414.1, 280/47.331; 114/344

[56] References Cited

U.S. PATENT DOCUMENTS

| | | |
|---|---|---|
| 2,727,484 | 12/1955 | White .................................. 114/344 |
| 4,214,774 | 7/1980 | Kluge ............................... 280/414.1 |
| 4,256,321 | 3/1981 | Trulove . |
| 4,392,665 | 7/1983 | Miller et al. ..................... 280/47.331 |
| 4,614,352 | 9/1986 | Cervantes . |
| 5,020,813 | 6/1991 | Gottschalk . |
| 5,020,814 | 6/1991 | George et al. . |
| 5,050,785 | 9/1991 | Hays . |
| 5,098,113 | 3/1992 | Albitre . |
| 5,176,395 | 1/1993 | Garforth-Bles . |
| 5,207,441 | 5/1993 | Granbery ......................... 280/47.331 |

FOREIGN PATENT DOCUMENTS

| | | | |
|---|---|---|---|
| 871580 | 1/1942 | France ................................. 280/204 |
| 878044 | 9/1942 | France ................................. 280/204 |
| 23899 | of 1909 | United Kingdom ................ 280/204 |
| 154974 | 11/1920 | United Kingdom ................ 114/344 |

Primary Examiner—Mitchell J. Hill
Attorney, Agent, or Firm—Merchant, Gould, Smith, Edell, Welter & Schmidt

[57] ABSTRACT

A trailer for a bicycle suited to transport loads such as canoes, surfboards, ladders, etc. The trailer includes a pair of wheels and a frame arrangement having a spreading member for the wheels and a longitudinally extending load receiving rigid framework. The various members are easily separable so that a flexible strap connected between the wheels and a part of the frame as well as the bicycle hold the frame arrangement together. The trailer thereby is lightweight, readily assembled and disassembled, and yet structurally strong to support the loads indicated.

10 Claims, 4 Drawing Sheets

BICYCLE TRAILER

FIELD OF THE INVENTION

This invention relates to trailers which may be pulled by bicycles. More particularly, the present trailer is especially useful for portaging a canoe.

BACKGROUND OF THE INVENTION

Anyone who has ever portaged a canoe knows the difficulty of dealing with both the weight on a person's shoulders, as well as the maneuverability of the length of the canoe both forward and rearward. Sometimes it is easier for two people, rather than one, to carry the canoe. There is no known trailer for a canoe which is easily pulled by a bicycle. There are known, however, bicycle trailers, most of which are for carrying children. U.S. Pat. No. 4,614,352 and U.S. Pat. No. 4,256,321 show collapsible trailers. In every known design of a bicycle trailer, however, the framing tends to be either fixedly configured or, if collapsible, rather complex. Known designs do not appear capable of supporting both a heavy load and a long load which is difficult to maneuver, while at the same time being collapsible or capable of being broken down into a small package for storage or actual transport by the load, such as a canoe.

SUMMARY OF THE INVENTION

The present invention is directed to a bicycle trailer for supporting a load. The trailer includes a pair of wheels and mechanism for mounting the wheels. The trailer also includes rigid mechanism for transversely spreading the mounting mechanism such that the rigid spreading mechanism is separable from the mounting mechanism in a first direction, generally vertical. The trailer further includes rigid mechanism connected to the spreading mechanism for receiving the load. The rigid receiving mechanism includes a plurality of members and mechanism for separating along a second direction, generally longitudinal, the members from one another and from the spreading mechanism. The trailer still further includes flexible mechanism connected to the mounting mechanism for retaining the load on the receiving mechanism. The retained load applies force in a direction opposing the first direction and preventing the rigid spreading mechanism from separating from the mounting mechanism. Finally, in the present preferred embodiment, the trailer includes flexible mechanism connected to the mounting mechanism for attaching the trailer to the bicycle. The attaching mechanism applies force in a direction opposing the second direction and preventing the members of the rigid load receiving mechanism from separating from one another and from the spreading mechanism.

More particularly, there are rigid, lightweight metallic members used throughout to create a frame which can be readily taken apart to become, for example, a reasonably lightweight and small volume cargo for a canoe. The framing includes the wheel mounting mechanisms. A spreading member is mounted near the top of the wheel mounting mechanisms to keep the tops of the mechanisms separated and provide at that location support for the trailer load. There is extending forward longitudinally from the spreading member a plurality of separable rigid members for receiving the load. The various members are separable by telescopically sliding them longitudinally with respect to one another. The members extend to a location near the bicycle seat when the trailer is attached to the bicycle. Flexible strapping holds the rigid framing together and holds the load on the framing. Furthermore, the strapping attaches the trailer to the bicycle seat. The lightweight rigid metallic members in combination with the wheels and the strapping form a trailer useful for moving a canoe or other load by bicycle. The trailer is easily taken apart for storage or for placing in the central storage region of a canoe for transport between portages. Note that a lightweight bicycle can also be placed in the canoe. In that regard, the bicycle may be placed in the canoe for travel on water or also on rough portage trails. If the bicycle is placed in the canoe, the trailer can then be pulled manually.

DETAILED DESCRIPTION OF THE PREFERRED EMBODIMENT

Figure 1:
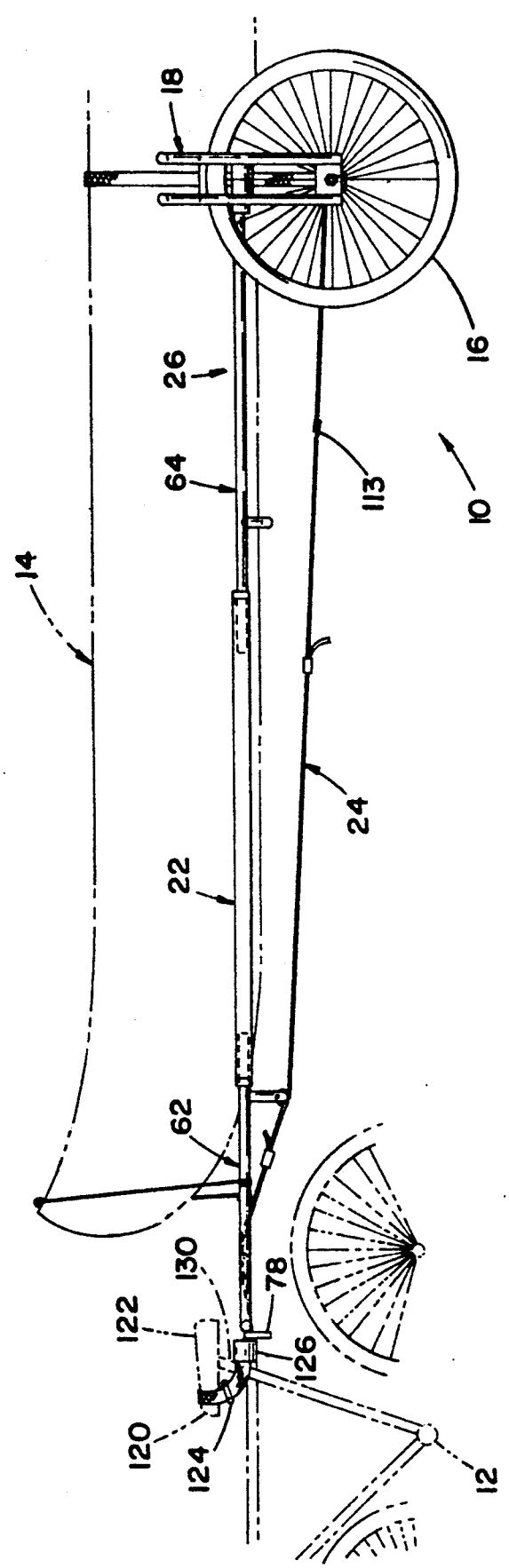
FIG. 1 is a side view of a trailer in accordance with the present invention, showing a bicycle and a canoe in broken lines.

Referring now to the drawings wherein like reference numerals designate identical or corresponding parts throughout the several views, and more particularly to FIG. 1, a trailer in accordance with the present invention is designated generally by the numeral 10. A bicycle 12 is shown in broken lines pulling trailer 10. A canoe 14 is shown in broken lines loaded on trailer 10.

Figure 2:
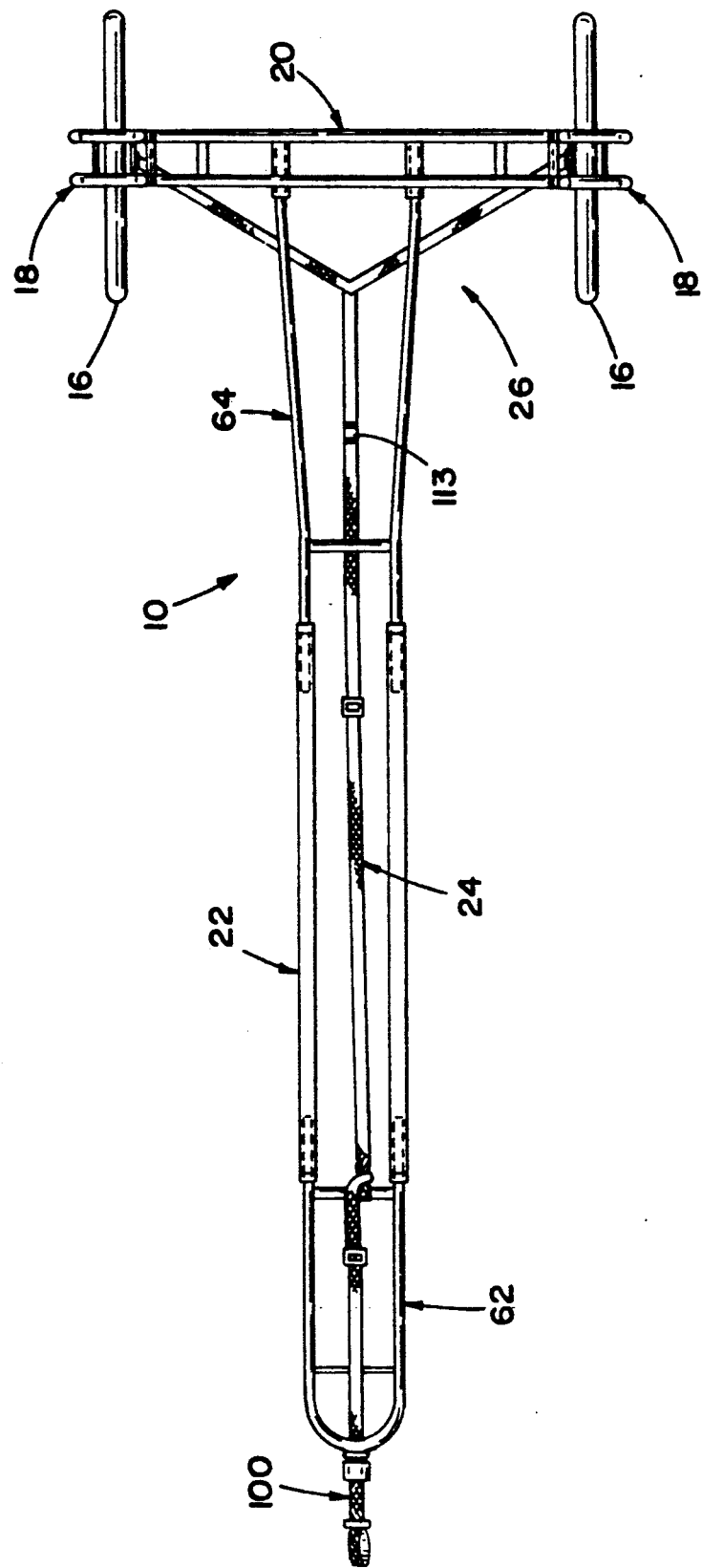
FIG. 2 is a top view of the trailer.

Trailer 10 has a pair of wheels 16 and mechanism 18 for mounting each wheel 16. As shown in FIG. 2, there is rigid mechanism 20 for transversely spreading each mounting mechanism 18. A rigid spreading load receiving mechanism 22 extends longitudinally forwardly from spreading mechanism 20. Trailer 10 further includes flexible mechanism 24 for attaching the bicycle 12 and canoe 14 to the frame arrangement 26, represented by the above-noted rigid mechanisms supported by wheels 16.

Figure 4:
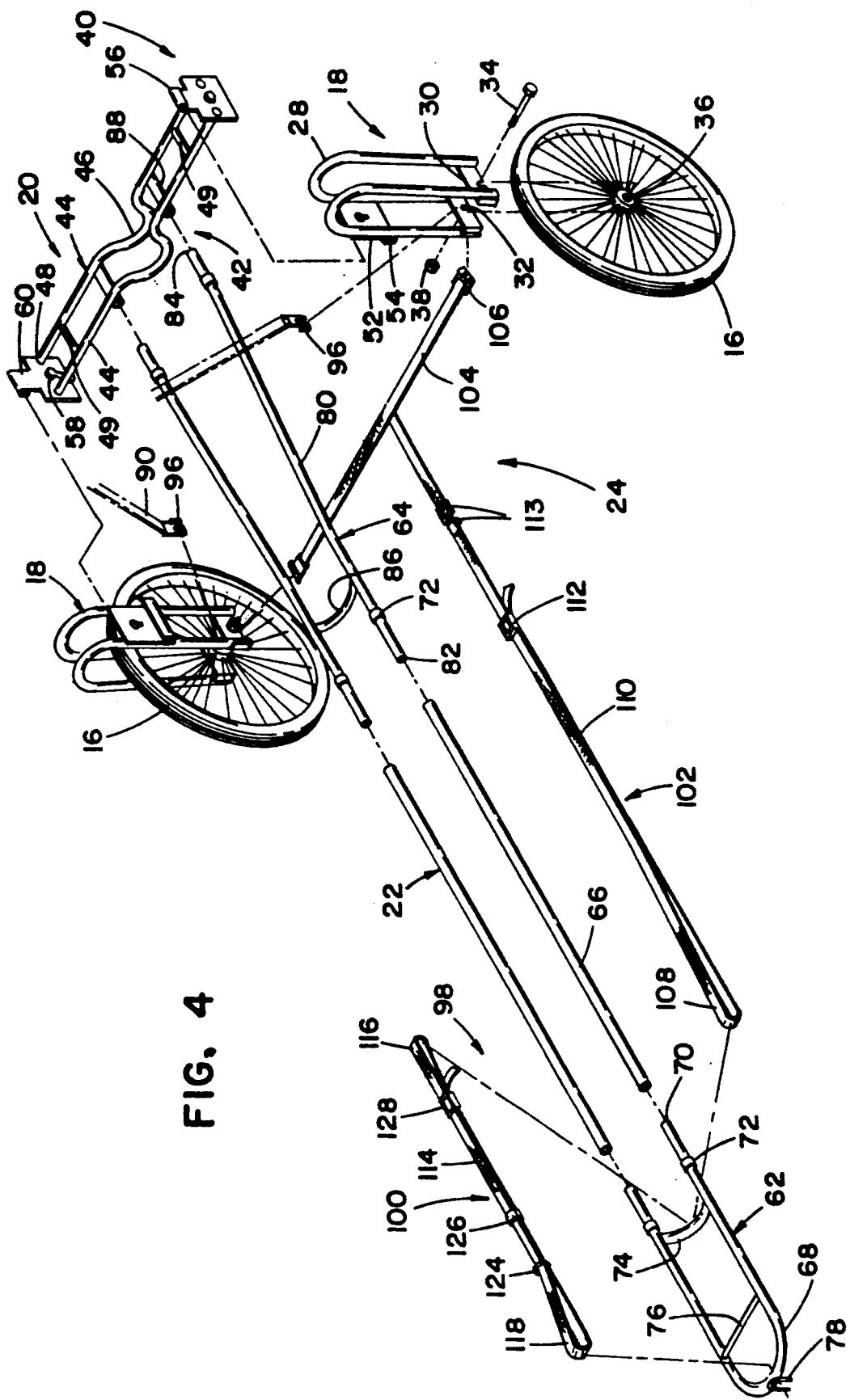
FIG. 4 is an exploded, perspective view of the trailer.

With reference to FIG. 4, mounting mechanism 18 includes a pair of inverted U-shaped tubular members 28. An axle mount plate 30 with a notch 32 centered along the lower edge thereof is fastened between each pair of ends of U-shaped members 28 to hold members 28 spaced apart. A conventional bicycle wheel 16 fits between the legs of each U-shaped member 28 so that a bolt 34 is received in notches 32 and through the central bushing 36 of wheel 16 to form an axle for wheel 16 as mounted on mechanism 18. Nut 38 secures bolt 34 in place.

Upper spreading mechanism 20 provides transverse rigidity between mounting mechanisms 18 at a height upwardly from the wheel axles. Spreading mechanism 20 is detachably fastened to each of mechanisms 18 with a fastening mechanism 40. Similarly, load receiving mechanism 22 is receivably connected to spreading mechanism 20 at mechanism 42. More particularly, spreading mechanism 20 includes a pair of transversely-extending, tubular members 44. Each member 44 includes a U-shaped portion 46 centrally located between its ends 48. U-shaped portion 46 functions to receive the keel of a canoe in the case where the load for the trailer is a canoe. A tube 49 is fastened between members 44 at locations on opposite sides of U-shaped portions 46 so as to receive strap 92 outwardly of tubes 49 thereby keeping canoe 14 centered.

Fastening mechanism 40 includes complementary plate members 50 and 52. Each plate member 52 is attached to one of the wheel mounting mechanisms 18. Plate member 52 is fastened between tubes 28 at a spaced distance above the inner one of axle mount plate 30. Plate 52 includes an upwardly turned lip 54 on the side of plate member 52 opposite tubes 28.

A plate member 50 is fastened between tubes 44 at each end 48 to hold tubes 44 spaced apart. Plate member 50 has an outwardly turned lip 56 on the side of plate member 50 opposite tubes 44. Plate members 50 and 52 have vertical lengths such that the bottom of plate member 50 is retained by lip 54 while the top of plate member 52 is retained by lip 56. In this regard, note that the upper portion 60 of each plate member 50 has a narrowed width as compared with the lower portion so that lip 56 fits between tubes 28 when spreading mechanism 20 is installed as indicated. A conventional bicycle wheel cam lock 58 is installed with respect to each plate 52 in order to provide frictional force against plate members 52 to retain spreading mechanism 20 to mounting mechanisms 18. Additionally, the load on trailer 10 as it rests on spreading mechanism 20 also retains mechanism 20 in its desired location with respect to mounting mechanisms 18.

Load receiving mechanism 22 extends longitudinally in a forward direction from and is centered on spreading mechanism 20. Mechanism 22 includes forward and rearward portions 62 and 64 and intermediate extension members 66 therebetween. Each extension member 66 is a hollow tube. The length of the tube may be shorter or longer depending on what is required to best accommodate the planned load.

Forward portion 62 includes a U-shaped tube 64. Tube 64 has an outer diameter just slightly smaller than the inner diameter of each of hollow extension tubes 66. In this way, the ends 70 of tube 68 are slideably received by extension tubes 66 for connecting thereto and easily being separable therefrom. Stop members 72 are fastened at a spaced distance from ends 70 so that tube 68 is only inserted into extension tubes 66 a distance up to stops 72. A pair of cross-members 74 and 76 are fastened between the opposite legs of U-shaped tube 68. One or both of cross-members 74, 76 may be arcuately shaped as appropriate to receive the keel of canoe 14 or otherwise accommodate a planned load. A downwardly opening U-shaped retainer member 78 is fastened in a centered position at the very forward end of forward portion 62 for the purpose of retaining strap 114.

Rearward portion 64 includes a pair of tubes 80. Tubes 80 have the same diameter as tube 68 so that they fit in extension tubes 66. Stop members 72 are also fastened at spaced distances from both forward and rearward ends 82 and 84 of each of tubes 80. A cross-member 86 is fastened between tubes 80. A pair of short tube members 88 are fastened between tubes 44 of spreading mechanism 20 on opposite sides of U-shaped portion 46. Tubes 48 have similar sizes as tubes 66 in order to receive ends 84 of tubes 80.

Thus, the rigid load receiving mechanism 22 includes a plurality of members as indicated and mechanism for connecting the members with and separating along a longitudinal direction the members from one another and the spreading mechanism 20.

Figure 3:
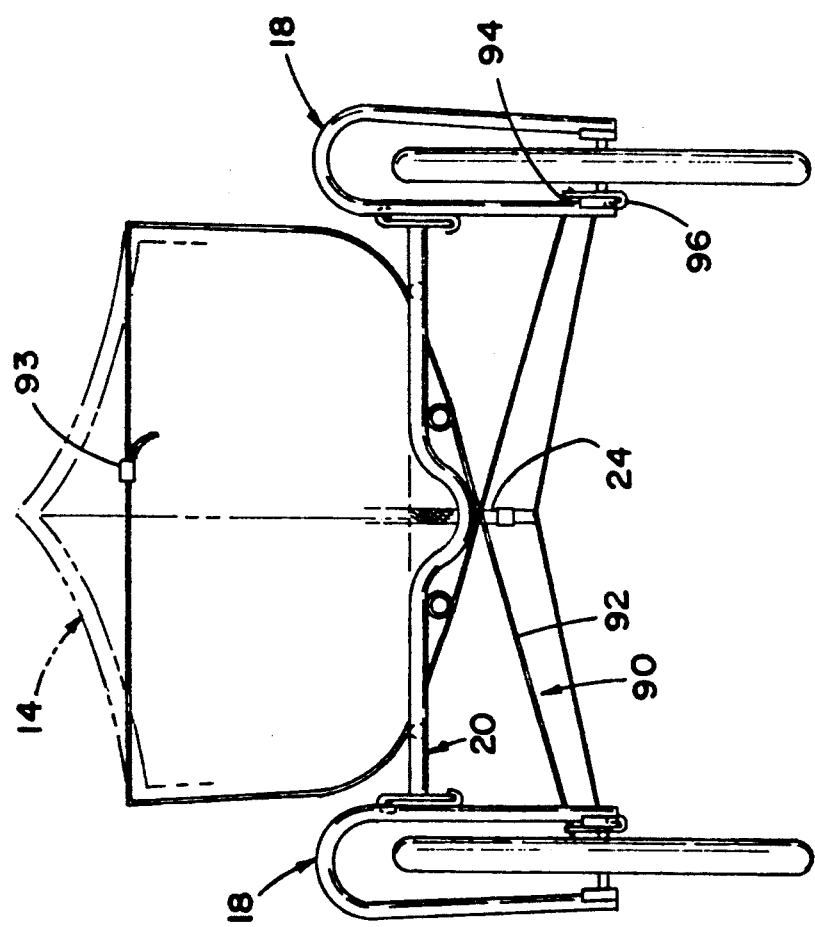
FIG. 3 is a rear view of the trailer, showing a canoe in broken lines.

The mechanism 24 for attaching the load and the bicycle to the frame arrangement 26 of trailer 10 is shown particularly with reference to FIGS. 3 and 4. Mechanism 24 includes flexible mechanism 90 connected to mounting mechanism 18 for retaining the load 14 on the receiving mechanism 22. More particularly, mechanism 90 includes a strap 92 having an adjustable buckle 94. Strap 92 may be both tightened or loosened at buckle 94 and unbuckled or separated for easy release or attachment to canoe 14. Each end 96 of strap 92 is looped about and sewn or otherwise tied or fastened through an opening (not shown) to a hook member 96 which has a slot (not shown) for fitting over axle 34 such that hooking lips on each side of axle 34 hook around plate member 32.

Attaching mechanism 24 further includes flexible holding mechanism 98 connected to mounting mechanism 18 for holding trailer 10 to bicycle 12. Holding mechanism 98 includes flexible mechanism 100 for hitching trailer 10 to bicycle 12 and flexible mechanism 102 for pulling wheels 16 toward one another and for preventing the load receiving mechanism 22 from separating.

Lower mechanism 102 is a flexible strap having a Y-formation when stretched taught. The legs 104 of the Y-formation have ends 106 attached to hook member 96. The end 108 of base leg 110 has a loop which fits about cross-member 74 and, because it pulls somewhat downwardly, seeks the center, lowermost, location on cross-member 74. Base leg 110 further includes an adjustable mechanism 112 and a separation buckle 113. In this way, when the frame arrangement 26 is fully connected together, hook members 94 may be installed and the ends of buckle 113 brought together and fastened. Mechanism 112 may then be adjusted to tighten strap 102 thereby pulling wheels 16 toward one another at about axle height and preventing load receiving mechanism 22 from separating. Thus, a longitudinally directed force is applied in a direction opposite the direction which would allow the various members of mechanism 22 to separate.

Mechanism 100 is a flexible strap 114 having a loop 116 at the rearward end for fitting about strap 102 and a loop 118 at the forward end for fitting about the front nose 120 of seat 122 of bicycle 14. An O-ring 124 and a flexible cylindrical spacer 126 encircle strap 114 along the more forward portion of strap 114. An adjustable buckle 128 is located nearer the rearward portion of strap 114. Strap 114 is preferably threaded over cross member 76 and between the downwardly extending legs of inverted U-shaped member 78. Loop 118 is opened to receive seat 122 such that opposite sides of loop 118 are on opposite sides of bicycle seat post 130. The O-ring 124 is taken off strap 114 before loop 118 receives seat 122 and is then installed onto the end of loop 118 after. The end of loop 118 is placed over nose 120 of seat 122 and O-ring 124 is snugged up against the under side of nose 120. Spacer 124 is placed between post 130 and inverted U-shaped member 78. In this way, trailer 10 is securely hitched to bicycle 12. Also, spacer 126 cushions any contact between forward portion 62 of frame arrangement 26 of trailer 10 with bicycle 12.

Although the present disclosure is provided in a way which shows trailer 10 transporting a canoe, it is understood that other loads such as ladders, wood, surfboards, sailboats, etc. may be transported as well. In any case, with respect to a canoe, the present trailer is particularly useful during a portage operation. Assuming the canoe is in the water with the bicycle and the unassembled trailer, the first step of a portage operation would be to remove the bicycle and the various trailer members from the canoe. The trailer would then be assembled in accordance with the previous disclosure. The canoe would be fastened to the trailer. The trailer would be attached to the bicycle and pulled as appropriate. After portaging the canoe as desired, the trailer would be unattached from the bicycle and the canoe removed from the trailer and placed in water. The trailer would then be disassembled and, along with the bicycle, placed in the canoe.

The simplicity of the design of the present trailer leads to relatively rapid assembly and disassembly which can be accomplished by a single person. The canoe can be loaded on the trailer by a single person and one or more people can even ride in the canoe while someone else is riding the bicycle and pulling the trailer and canoe. The various portions of the trailer have been described with particularity, but it is understood, just as the load may be of various types, so the various elements and assemblies of the trailer may be modified within the principle of the invention. As such, the invention then is limited only by the scope of the claims which follow.

What is claimed is:

1. A bicycle trailer for supporting a load, comprising:
a pair of wheels and means for mounting said wheels;
rigid means for transversely spreading said mounting means, said rigid spreading means being separable from said mounting means in a first direction;
rigid means connected to said spreading means for receiving said load, said rigid receiving means including a plurality of members and means for connecting said members with and separating along a second direction one of said members from another of said members and said spreading means;
flexible retaining means connected to said mounting means for retaining said load on said receiving means, said load retained by said flexible retaining means applying force in a direction opposing the first direction and preventing said rigid spreading means from separating from said mounting means; and
flexible holding means connected to said mounting means for holding said trailer to said bicycle, said holding means applying force in a direction opposing the second direction and preventing one of said members of said rigid load receiving means at said connecting and separating means from separating from another of said members and from said spreading means.

2. A bicycle trailer for supporting a load, comprising:
a pair of wheels;
a frame arrangement supported by said wheels, said frame arrangement including means for mounting each of said wheels, said frame arrangement also including upper means for transversely spreading said mounting means and means connected to said spreading means extending longitudinally and separable longitudinally for receiving said load;
means for attaching said load and said bicycle to said frame arrangement, said attaching means including lower means connected to said mounting means for pulling said wheels toward one another and for preventing said load receiving means from separating.

3. The trailer in accordance with claim 2 wherein said frame arrangement includes means for detachably fastening one of said mounting means and said upper spreading means, said detachably fastening means including complimentary members with a first of said members attached to said one of said mounting means and a second of said members attached to said upper spreading means, said first of said members including first means for retaining said second of said members and said second of said members including second means for retaining said first of said members.

4. The trailer in accordance with claim 3 wherein said receiving means includes forward and rearward portions and intermediate extension members connectably receiving said forward and rearward portions, said frame arrangement further including means attached to said upper spreading means for receivably connecting said rearward portion and said spreading means.

5. The trailer in accordance with claim 4 wherein said forward and rearward portions include smaller tubes with stops attached thereto and said extension members and said connecting means include larger tubes which telescopingly receive said smaller tubes up to said stops.

6. The trailer in accordance with claim 2 wherein said attaching means includes a flexible strap.

7. The trailer in accordance with claim 6 wherein said attaching means also includes a buckle for separating said strap.

8. The trailer in accordance with claim 6 including a seat on said bicycle and wherein said attaching means further includes a first ring for snugging said strap to said seat.

9. The trailer in accordance with claim 7 wherein said attaching means also includes a spacer for maintaining a separation of said receiving means from said seat.

10. A method for portaging a canoe using a bicycle and a trailer made from a plurality of members, comprising the steps of:
removing said bicycle and said plurality of trailer members from said canoe;
assembling the plurality of members together to form the trailer;
fastening said canoe to said trailer;
attaching said trailer to said bicycle and pulling said trailer with said bicycle;
disassembling said trailer from said bicycle;
removing said canoe from said trailer;
disconnecting said plurality of members and placing said members in said canoe;
placing said bicycle in said canoe and paddling said canoe in water.

* * * * *